US011397777B2

(12) United States Patent
Roth

(10) Patent No.: US 11,397,777 B2
(45) Date of Patent: Jul. 26, 2022

(54) SYSTEM AND METHOD FOR ASSOCIATING ENDORSERS WITH ARTICLES ON THE INTERNET

(71) Applicant: Frederick Roth, San Jose, CA (US)

(72) Inventor: Frederick Roth, San Jose, CA (US)

(73) Assignee: Transactable Corporation, Foster City, CA (US)

( * ) Notice: Subject to any disclaimer, the term of this patent is extended or adjusted under 35 U.S.C. 154(b) by 160 days.

(21) Appl. No.: 16/682,974

(22) Filed: Nov. 13, 2019

(65) Prior Publication Data
US 2021/0141840 A1    May 13, 2021

(51) Int. Cl.
*G06F 16/93*    (2019.01)
*G06F 16/955*    (2019.01)

(52) U.S. Cl.
CPC .......... *G06F 16/93* (2019.01); *G06F 16/9566* (2019.01)

(58) Field of Classification Search
None
See application file for complete search history.

(56) References Cited

U.S. PATENT DOCUMENTS

| 9,154,491 | B1 | 10/2015 | Leske | |
| 9,842,297 | B1 | 12/2017 | Deluca et al. | |
| 2004/0267724 | A1* | 12/2004 | Hoffman | G06F 16/9558 |
| 2005/0289653 | A1 | 12/2005 | Darling et al. | |
| 2006/0004713 | A1* | 1/2006 | Korte | G06F 16/9535 |
| 2007/0203887 | A1* | 8/2007 | Dynin | G06F 16/9535 |
| 2010/0031140 | A1 | 2/2010 | Cummins | |
| 2010/0250591 | A1* | 9/2010 | Morris | G06F 16/951 |
| | | | | 707/770 |
| 2011/0184818 | A1 | 7/2011 | Dance et al. | |
| 2013/0097142 | A1* | 4/2013 | Kim | G06Q 50/01 |
| | | | | 707/706 |
| 2013/0097143 | A1* | 4/2013 | Shenoy | G06F 16/9535 |
| | | | | 707/706 |
| 2013/0097144 | A1* | 4/2013 | Siamwalla | G06Q 10/10 |
| | | | | 707/706 |
| 2013/0339332 | A1* | 12/2013 | Ogram | G06F 16/9535 |
| | | | | 707/705 |
| 2015/0371034 | A1 | 12/2015 | Miller et al. | |
| 2020/0014697 | A1* | 1/2020 | Karin | G06N 20/00 |

* cited by examiner

*Primary Examiner* — Christopher J Raab
(74) *Attorney, Agent, or Firm* — NetLawyers LLP; Benedict O'Mahoney

(57) ABSTRACT

Disclosed is a system and method for associating endorsers with articles on the internet. The invention establishes an assessor account for an assessor in an assessment database. The assessor account includes assessment attributes of an assessor. An article record is established for an article in the assessment database. The article record includes a URI, an article status from said assessor, and an association between the article record and the assessor account. The system responds to a request from an article viewer in which the request includes the URI of the article by querying the assessment database, determining if the URI supplied is associated with an article record, and if so, returning to the article viewer a response that includes the article status.

8 Claims, 5 Drawing Sheets

SYSTEM AND METHOD FOR ASSOCIATING ENDORSERS WITH ARTICLES ON THE INTERNET

CROSS-REFERENCE TO RELATED APPLICATIONS

Not applicable.

FEDERALLY SPONSORED RESEARCH

Not applicable.

SEQUENCE LISTING OR PROGRAM

Not applicable.

FIELD OF INVENTION

The present invention relates to computer implemented systems for associating attributes to articles on the interne.

BACKGROUND OF THE INVENTION

The world is awash in information, and much of it should not be trusted for any one of a number of reasons. Humanity depends on four critical elements for survival: 1) breathable air, 2) potable water; 3) edible food; and 4) truthful information. While nations of the world have recognized the importance of protecting air, water and food, pollution of the information environment has been allowed to proliferate largely unchecked. The consequence is a diminished trust in public dialogue resulting in part from 1) flagrant deception; 2) manipulation; 3) partisan and polarizing ideologies; 4) lack of sanctions, either positive or negative; and 4) learned helplessness.

The Internet and public media have become increasingly polluted with lies and disinformation. Russia, China, North Korea and other actors, have weaponized fake information by targeting it to people who have no easy way to avoid it. People now realize how manipulators use Twitter and Facebook to generate thousands of lies that bombard millions immediately and repetitively. The amount of deceptive information has grown exponentially. The glut of toxic media has a chilling effect on social discourse as people tune out to escape. Many people have stopped following the news and social media.

Readers and viewers have no way to filter the bogus information from the rest, so they must wade through increasingly large volumes of chaff to find, if they are lucky, the kernels of truth. Anybody can get an online account, using whatever name they choose, and they are free to spew information pollution. Moreover, weaponized disinformation campaigns procure millions of robotic accounts and use these to generate, repeat, and favor their own chosen phony memes. Millions of bots and paid posters create false and deceptive content. Consumers are misled, and the content of reputable authors and publishers is subject to doubt.

Several services exist for the purpose of distinguishing factual statements from incorrect statements and misrepresentations.

JustFacts researches and publishes verifiable facts about the leading public policy issues through the use of a Standards Of Credibility to determine what constitutes a credible fact and what does not. The Standards Of Credibility comprise the following attributes: 1) Facts: facts are presented as plain as possible and use language that is clear and precise; 2) Excluded Facts: "facts" excluded are those that are rendered pointless by other facts and those that do not otherwise meet the Standards of Credibility; 3) Accuracy: sources are not used uncritically, and research contains footnotes with direct quotes and/or raw data from the cited sources; 4) Estimates and Minor Discrepancies: these are handled by giving preferentiality to figures that are contrary to their viewpoints and by using the most cautious plausible interpretations of such data; 5) Conclusions and Quotes: quotes are kept within context, conclusions and quotes made by people with vested interests are excluded except to point out inconsistencies and hypocrisy; 6) Incomplete Data: "facts" that do not account for vital contextual information are not included in research; 7) Balance: the goal is comprehensive accuracy as opposed to balance since the goal is to publish verifiable facts regardless of the views they support, not to circulate half-truths and propaganda. However, JustFacts does not allow third parties to initiate a topic, does not provide a market based mechanism for sourcing and validating information, and there is limited negative impact to purveyors of falsehoods.

Factcheck.org is a nonpartisan, nonprofit "consumer advocate" for voters that aims to reduce the level of deception and confusion in U.S. politics. Factcheck.org monitors the factual accuracy of what is said by major U.S. political players in the form of TV ads, debates, speeches, interviews and news releases. Their stated goal is to apply the best practices of both journalism and scholarship, and to increase public knowledge and understanding.

U.S. patent application Ser. No. 13/066,038 to Hayes-Roth provides for a truth-seal affixing system that creates and provides a computer-renderable instance of a truth-seal annotation schema for a truth-seal to be affixed to a digital statement within a digital document. The truth-seal annotation schema instance contains truth-seal values for rendering and displaying the truth-seal of the digital statement within the digital document allowing readers when viewing the digital document to: (i) identify the existence of the truth-seal, and (ii) request or determine truth-seal values of the truth-seal. The truth-seal affixing system further accesses and interprets instances of a truth-seal annotation schema for any affixed truth-seals. A computer program analyses the truth-seals of digital statements of all digital documents in a set to generate a computer accessible output: (i) identifying the existence of truth-seals, and (ii) extracting one or more of truth-seal values of any truth-seals affixed to each of the documents in the set. While this invention does provide a market-based mechanism for ensuring integrity of public statements, it does not address associating endorsers of a statement or article with a mechanism for determining and displaying the reputation of the endorser.

The media platforms of today have little incentive to bar phony authors and their bogus posts. These platforms measure success in terms of total time human eyeballs are exposed to their content, even when most or all of it misleads and misinforms. As a consequence, thoughtful people do not trust the Internet and popular media. Increasingly, people find media aversive and they want an escape. What is needed is a system to allow consumers to filter out all information from untrusted sources automatically.

What is needed is an efficient way to filter out false and anonymous information so the remaining articles can be trusted. What is needed is a system that makes it easy for real, honest people to create and endorse factual articles, and then filter out bogus information so it never reaches readers who opt for filtering. What is needed is an automated and scalable authentication solution that verifies the identity of producers and endorsement of their fact-checking processes to enhance their reputations and the trustworthiness of their content. Every author in the improved system is a known human being or publisher who commits to honesty in publishing.

There are several ways to implement a filter for trusted sources. One way is to use a browser plug-in. Once a user installs the plug-in to their browser, they can opt to filter out untrusted sources automatically. This enables users to consume only content from trusted sources. Reputable publishers can be enabled to add these optional filtering capabilities to their apps as well. An ability to filter content by trustworthiness should make every platform more valuable.

The present invention comprises a system that associates an Endorser with an article, allows viewers of the article to determine the identity of the Endorser and the reputation of the Endorser.

SUMMARY OF THE INVENTION

Definitions

"Adjudication process" means a process of verifying or denying the article status of an article when the article status has been initially set to mistrusted by an assessor.

"Article" means content conveying information, which may comprise written material, images, video, or other communicative information distributed on the Internet.

"Article status" means the state of article, which may be either trusted, unknown, or mistrusted. An article status of trusted or mistrusted means that the article has been assessed by an assessor. An article status of unknown means that the article has not been assessed by an assessor.

"Article viewer" means an apparatus for viewing articles that is capable of conveying the article status to the user.

"Associated Assessor" means an assessor that has assessed a particular article.

"Author" means an entity that has created an article.

"Assessor" means an entity that vouches for the article status of an article other than unknown.

"Assessed article" means an article which has been assessed by an assessor.

"Assessment attributes" means characteristics of the assessor.

"Assessment database" means a database containing assessment attributes, URIs, and their associations.

"Challenging Assessor" means an assessor who challenges the article status of an article.

"Publisher" means an entity that makes an article available for viewing on the Internet.

"URI" means a uniform resource identifier comprising a string of characters that unambiguously identifies a particular article.

"User" means an Internet user who makes a request to view an article.

INVENTION DESCRIPTION

In accordance with the present invention, there is provided a system and method for associating an endorser with an article on the Internet. Each article is identifiable by its unique URI. A user requests to view an article by providing the URI to an article viewer. When the article viewer accesses a URI, it queries an endorsement database to determine article status. If an endorser has endorsed the article, the article viewer will indicate that the article is trusted. If the article has not been endorsed by an endorser or a URI for the article is not in the endorsement database, the article viewer will indicate that the article status is unknown.

In another embodiment of the present invention, the article view will also convey endorsement attributes of the endorser of an endorsed article.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION

Figure 1:
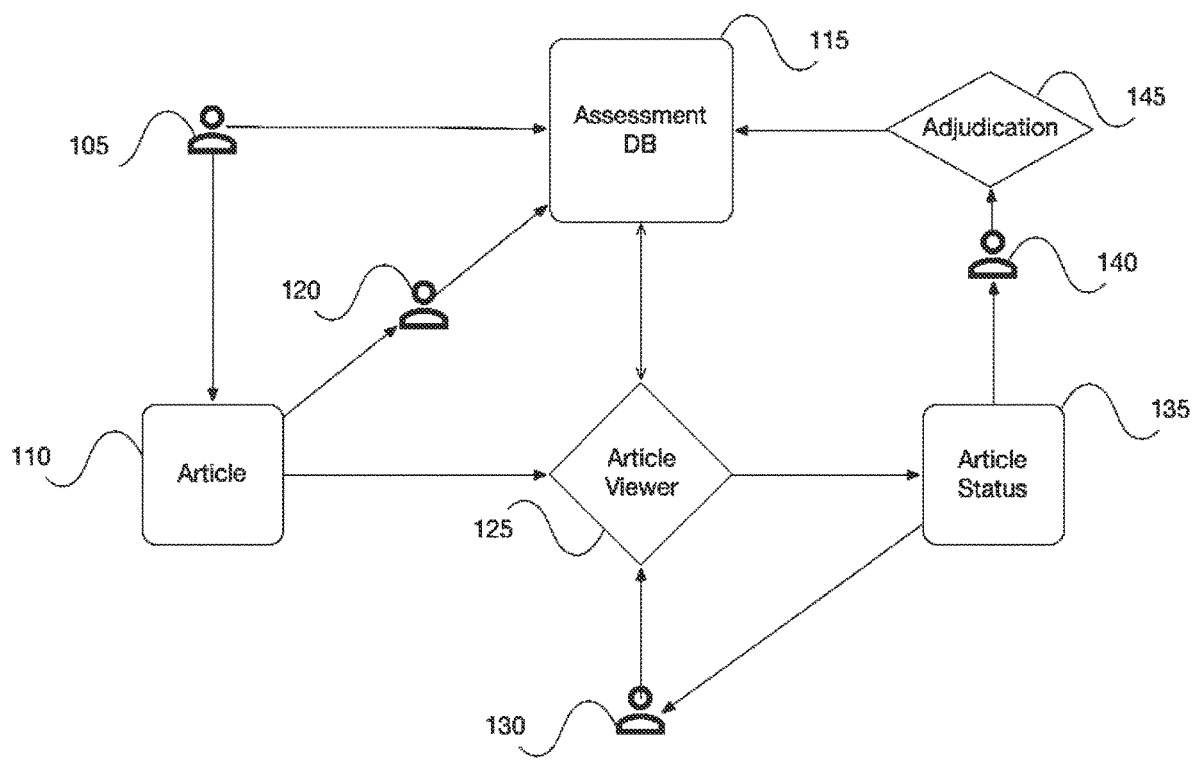
FIG. 1 is a block diagram of various functional components

Before the invention is described in further detail, it is to be understood that the invention is not limited to the particular embodiments described, as such may, of course, vary. It is also to be understood that the terminology used herein is for the purpose of describing particular embodiments only, and not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed with the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, if dates of publication are provided, they may be different from the actual publication dates and may need to be confirmed independently.

We describe a system that enables users to easily determine whether an article can be trusted by conveying to the user whether the article has been endorsed by an endorser. A further embodiment of the present invention provides the user with endorsement attributes. Examples of endorsement attributes may include name, profession, employer, reputation, identification, qualification, and history of the endorser. This allows a user to see who has endorsed an article and determine whether that endorser should be trusted.

An assessment database is used to record the associations between an article record, including a URI, and its assessor (which may be one or more assessors). The assessment database also records associations between the assessor and the attributes about that assessor that the article viewer can respond to. In the simplest case, there is only one assessor and the only attribute considered is whether the assessor is TRUSTED or MISTRUSTED. In this case, the article viewer shows the article and prominently displays TRUSTED or MISTRUSTED accordingly. In other cases, the user can request to filter out presentation of any article or portion of an article that has particular assessor attributes, such as MISTRUSTED.

An article can be composed of multiple articles, some of which are assessed articles as well. In this case, the article viewer accesses the assessment attributes for each assessed component as well as the overall article. The article viewer then displays the selected assessment attributes used for filtering. In the default case, the article viewer shows the TRUSTED or MISTRUSTED attribute for the overall article. The user can request to display this or other attributes for the overall article or any of its components, and can also request to filter retrieval and display to those articles or components that have the attributes of interest.

Accordingly, this invention provides a layer of information about the trustworthiness of articles and sources and filtering mechanisms sensitive to that information that enable consumers to find articles from trusted sources efficiently.

In some embodiments, the assessor informs the system that an entire directory should be considered TRUSTED. In this case, every article retrieved from that directory is viewed as TRUSTED. The assessor can indicate whether articles in all of that directory's subdirectories, if any, should be considered TRUSTED, or whether only those in the named TRUSTED directory itself should be TRUSTED.

This system can also maintain a reputation object about each known party. The party may be an author, publisher, assessor, user or challenging assessor of an article. The reputation object records some or all data pertinent to a party's reputation, including what identification materials were used to vouch for the party's online credentials and the process or service used to validate those materials and the process or service used to verify the party's online credentials. In addition, the system can maintain a history of the articles the party has authored, published, assessed, justified, accessed, and challenged. A party can justify an article by providing evidence for some of its assertions. A party can challenge an article by providing evidence refuting or undercutting some of its assertions. In a system context where adjudicators are called upon to assess evidence, the reputation object should also record the outcome of such adjudications. This makes it possible for reputations to be enhanced by supporting adjudications or deprecated in response to adverse adjudications. For example, the reputation of an author should be enhanced when a challenge to the author's evidence is rejected. The reputation of a party whose challenge to an article's veracity is upheld by adjudication should likewise be enhanced. Reputations can also be associated with articles, as with parties who author, publish, assess, justify and access articles.

In some environments, reputations are stored in a secure database. In one preferred implementation, reputations are recorded using a blockchain, making possible a complete chronological record of all transactions related to articles and parties. This would provide maximum information about reputations that could be supplied to people or programs that need it. In other embodiments, the reputations may be provided by distributed services called upon to supply or vouch for an assessor's credentials. A plurality of such services might be employed, so that the reputations are available through a federation of reputation services. This has the advantage of enabling a variety of identity authenticators to provide and support reputations.

Turning now to FIG. 1, shown is a block diagram of an embodiment of the present invention. An author 105 creates an article 110 which is made publicly available, such as posting on a public network such as the internet. A URI for the article 110 is lodged in an assessment database 115. Associated with the URI of the article 110 in the assessment database is an article status 135. If there are no assessment attributes associated with the article 110, then the system will set the article status 135 to UNKNOWN. An assessor 120 can assess an article 110 and make a determination of the article status 135 as TRUSTED or MISTRUSTED, and the system can associate that article status 135 with the article 110 in the assessment database 115. A user 130 who wishes to view an article 110 along with an indication of its trustworthiness can access the system with an article viewer 125. In one embodiment of the present invention, the article viewer 125 can be a browser plug-in, which can be downloaded and installed into common web browsers such as Google Chrome, Apple Safari, and Mozilla Firefox. When a user 130 accesses the system by requesting an article 110, the article viewer 125 retrieves the article 110 by accessing the URI for the article 110. The article viewer 125 also forwards the URI for the article 110 to the assessment database 115. The assessment database 115 looks up the association of the URI to the network status 135, and returns the network status 135 to the article viewer 125. If the article 110 does not have a URI lodged in the assessment database 115, or if there are assessment attributes associated with the URI, then the network status 135 returned is UNKNOWN. If there are assessment attributes associated with the URI, then the article status 135 will be either TRUSTED or MISTRUSTED. When the article viewer 125 presents the article 110 to the user 130, the article viewer 125 also presents the article status 135. In one embodiment of the present invention, the article status 135 is presented as an icon embedded in, or overlaid on, the article 110.

Continuing with FIG. 1, the system may also accept a challenge from a challenging assessor 140. If a challenging assessor 140 has evidence that an article status 135 for an article 110 is incorrect, the system may accept the evidence from the challenging assessor 140. The system's adjudication process 145 makes a determination as to whether the evidence presented by the challenging assessor 145 is persuasive, and if so, updates the article status 135 and assessment attributes in the assessment database 115.

Figure 2:
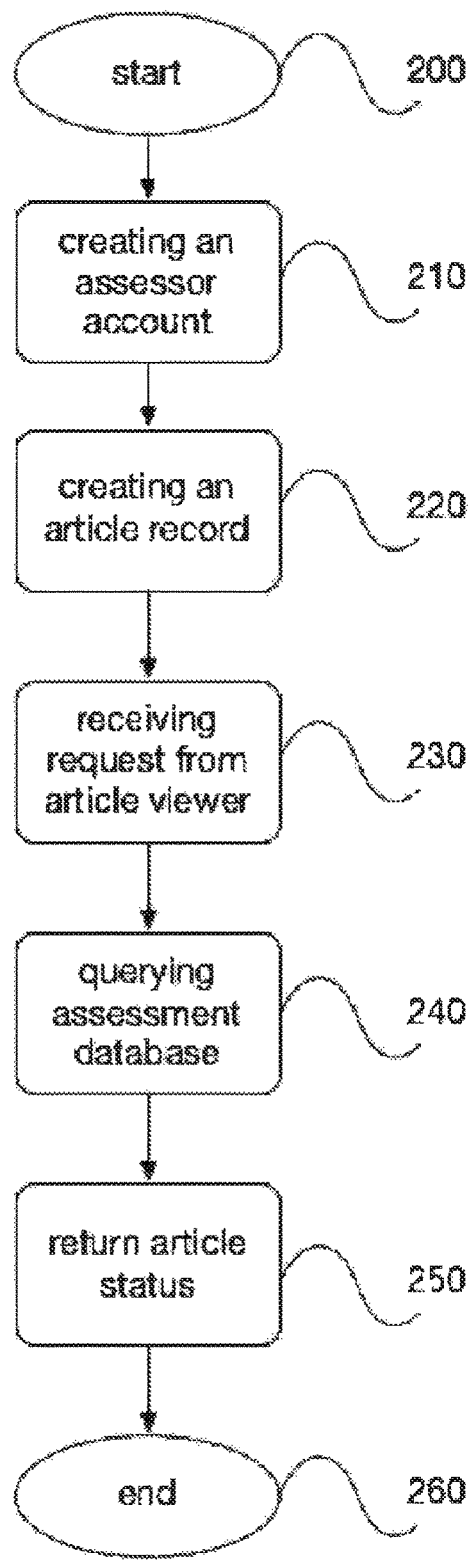
FIG. 2 is a flow chart of the initial process.

Turning now to FIG. 2, shown is the initial process of one embodiment of the present invention. The process starts 200 with the system creating an assessor account 210 that contains assessment attributes stored in an assessment database. The next step is creating an article record 220 for an article, wherein the article record contains an URI for an article, an article status, and an association to the assessor account of the assessor who assessed the article. The system is capable of receiving requests from an article viewer 230 which contain a URI to an article, then querying the assessment database 240 and retrieving the article status, and optionally, the assessment attributes, and returning the article status 250 to the article viewer for presentation to a user and ending the process 260.

Figure 3:
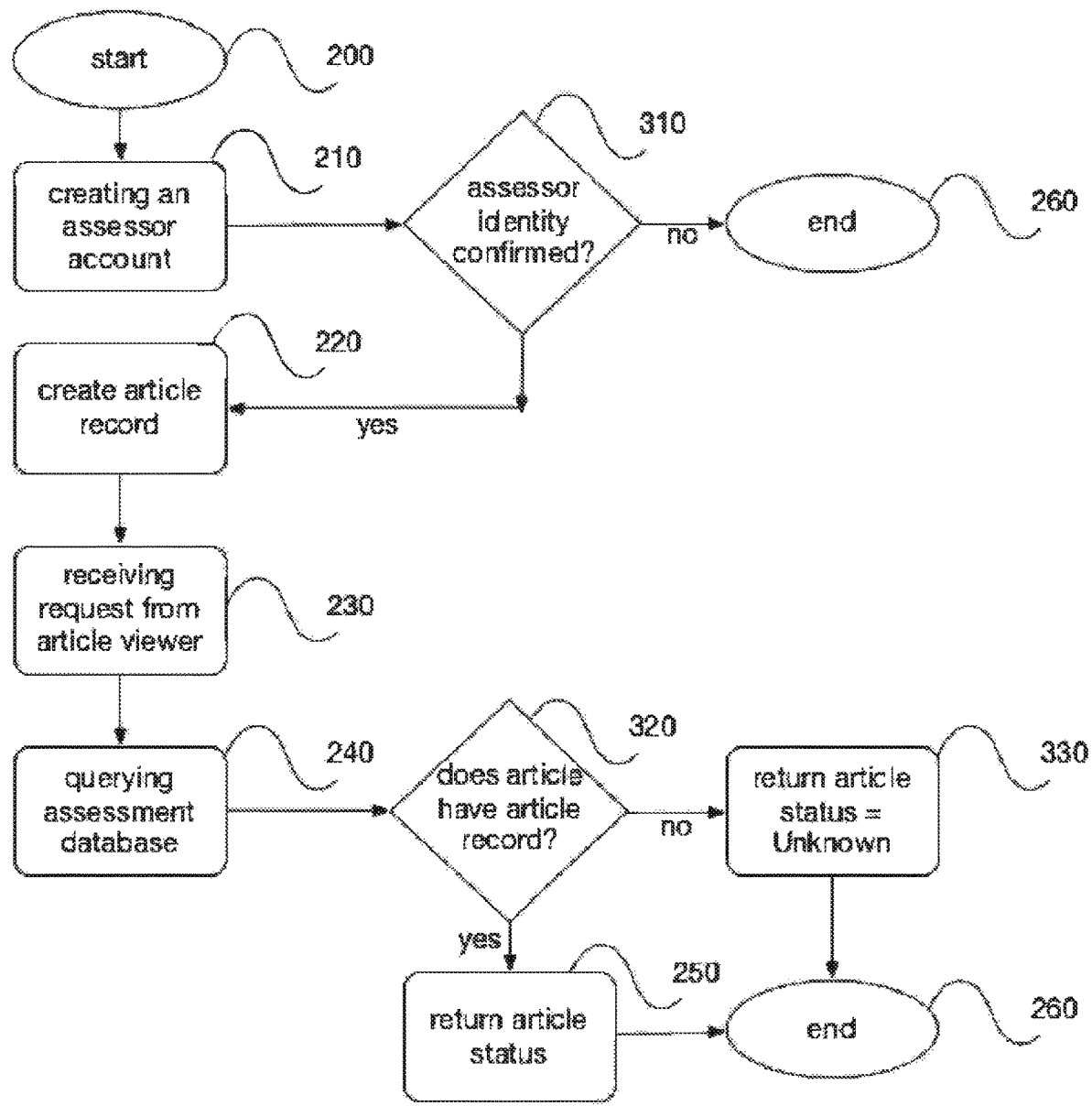
FIG. 3 is a flow chart of a process.

Turning now to FIG. 3, shown is a process of another embodiment of the present invention comprising starting 200 with the system creating an assessor account 210 which contains assessment attributes which are stored in an assessment database and then confirming the identity of the assessor 310. Failing to confirm the identity of the assessor terminates the process 260, otherwise the next step is creating an article record 220 for an article, wherein the article record contains an URI for an article, an article status, and an association to the assessor account of the assessor who assessed the article. The system is capable of receiving requests from an article viewer 230 which contain a URI to an article, then querying the assessment database 240 to determine if an article record exists and is associated with the URI 320. If no article record is associated with the URI, returning an article status of UNKNOWN 330, otherwise retrieving the article status, and optionally, the assessment attributes, and returning the article status 250 to the article viewer for presentation to a user and ending the process 260.

Figure 4:
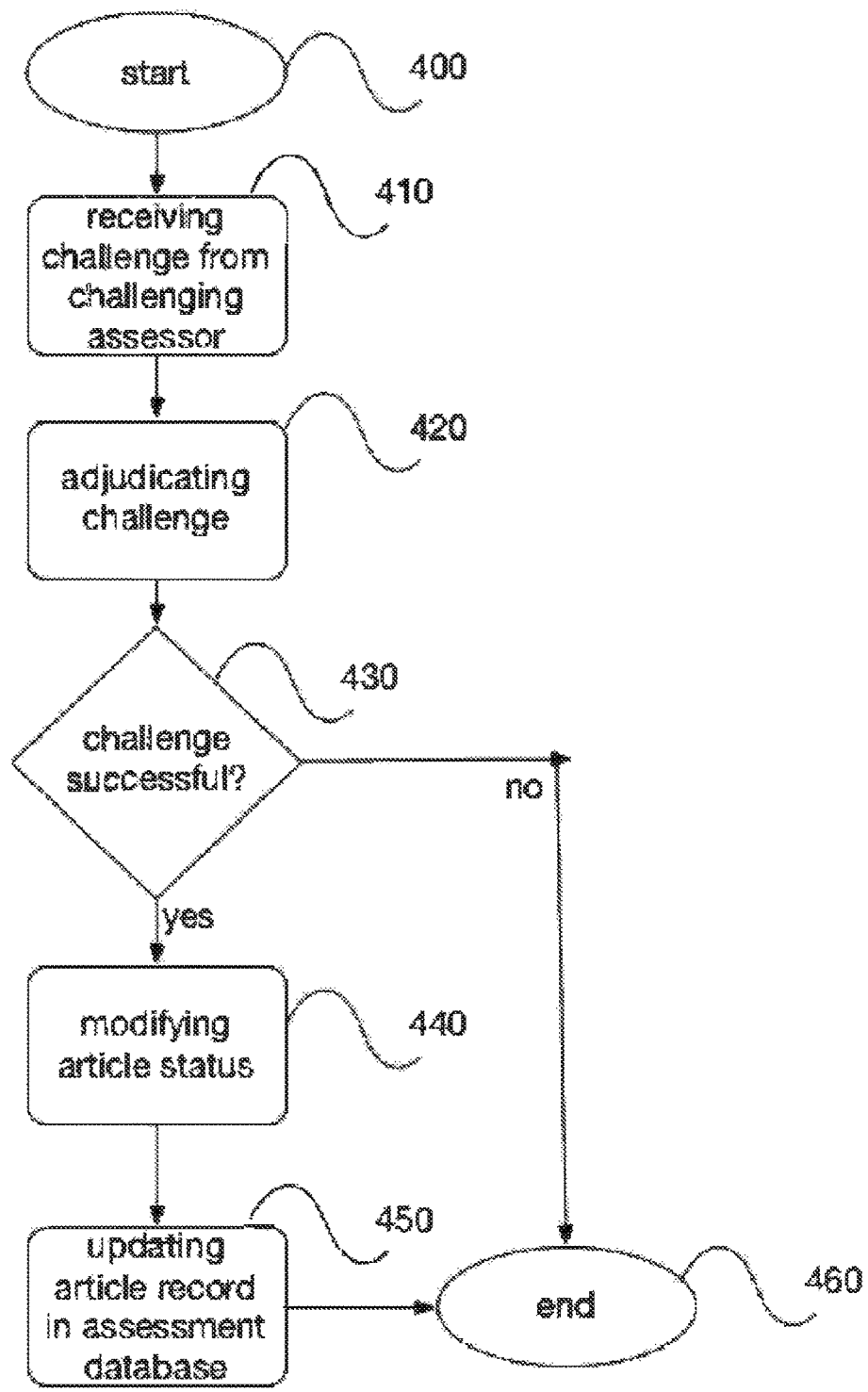
FIG. 4 is a flow chart of a process.

Turning now to FIG. 4, shown is a flow chart of another process of the present invention starting 400 with receiving a challenge from a challenging assessor 410 wherein the challenging assessor is presenting evidence that the article status of an article in the assessment database is incorrect, adjudicating the challenge 420 by determining whether the evidence presented by the challenging assessor is persuasive 430. If the evidence is not persuasive, terminating the process, otherwise updating the article status 440 and modifying the article record in the assessment database 450 and ending the process 460.

Figure 5:
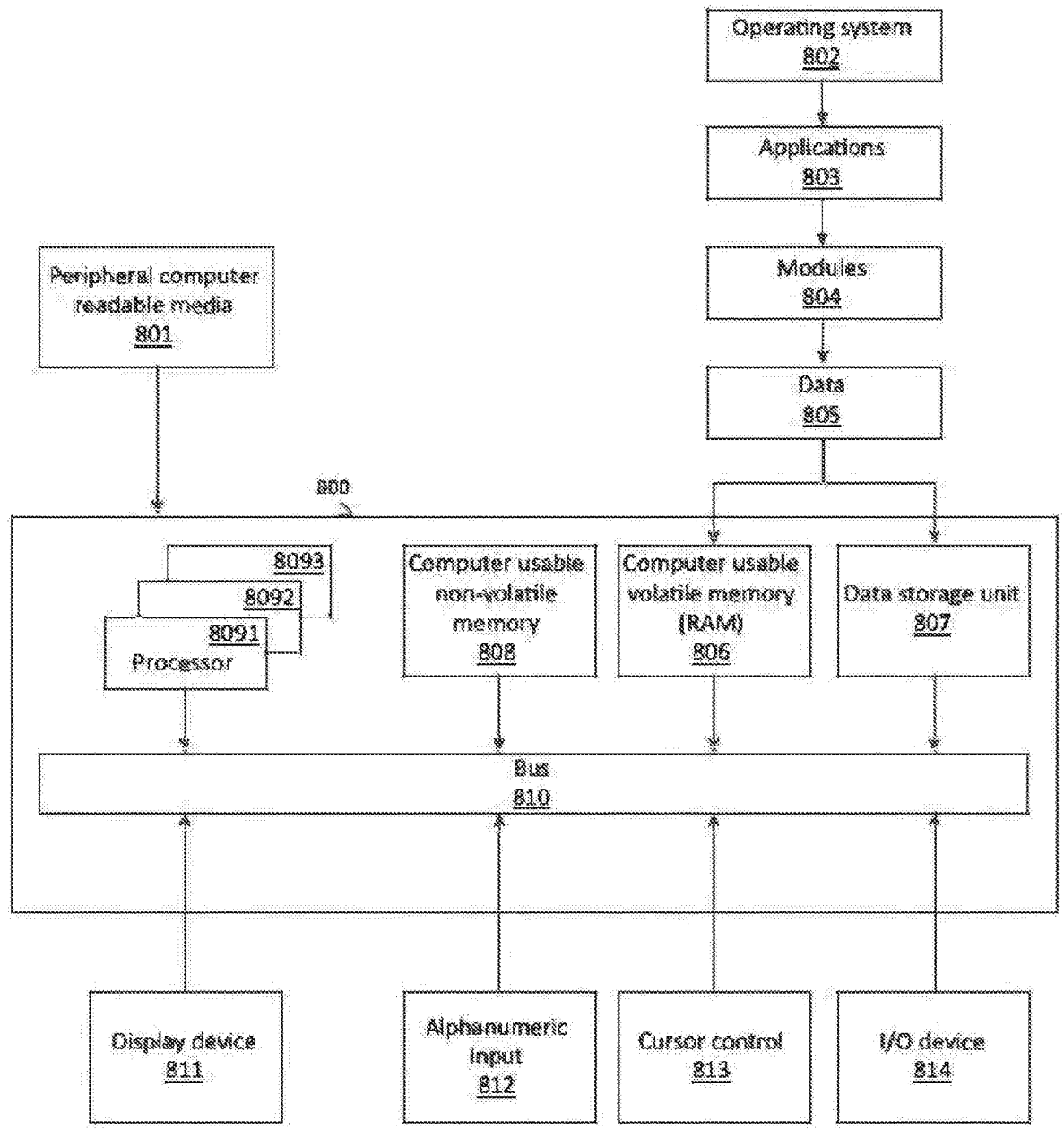
FIG. 5 is a block diagram of various functional components.

With reference now to FIG. 5, portions of the technology for providing computer-readable and computer-executable instructions that reside, for example, in or on computer-usable media of a computer system. That is, FIG. 5 illustrates one example of a type of computer that can be used to implement one embodiment of the present technology.

Although computer system 800 of FIG. 5 is an example of one embodiment, the present technology is well suited for operation on or with a number of different computer systems including general purpose networked computer systems, embedded computer systems, routers, switches, server devices, user devices, various intermediate devices/artifacts, standalone computer systems, mobile phones, personal data assistants, and the like.

In one embodiment, computer system 800 of FIG. 5 includes peripheral computer readable media 801 such as, for example, a floppy disk, a compact disc, flash drive and the like coupled thereto.

Computer system 800 of FIG. 5 also includes an address/data bus 810 for communicating information, and a processor 8091 coupled to bus 810 for processing information and instructions. In one embodiment, computer system 800 includes a multi-processor environment in which a plurality of processors 8092, 8093 are present. Conversely, computer system 800 is also well suited to having a single processor such as, for example, processor 8091. Processors 8091, 8092, 8093 may be any of various types of microprocessors. Computer system 800 also includes data storage features such as a computer usable volatile memory 806, e.g. random access memory (RAM), coupled to bus 810 for storing information and instructions for processors 8091, 8092 and 8093.

Computer system 800 also includes computer usable non-volatile memory 808, e.g. read only memory (ROM), coupled to bus 810 for storing static information and instructions for processors 8091, 8092, 8093. Also present in computer system 800 is a data storage unit 807 (e.g., a magnetic or optical disk and disk drive) coupled to bus 810 for storing information and instructions. Computer system 800 also includes an optional alpha-numeric input device 812 including alpha-numeric and function keys coupled to bus 810 for communicating information and command selections to processor 8091, 8092, 8093. Computer system 800 also includes an optional cursor control device 813 coupled to bus 810 for communicating user input information and command selections to processor 8091 or processors 8091, 8092, 8093. In one embodiment, an optional display device 811 is coupled to bus 810 for displaying information.

Referring still to FIG. 5, optional display device 811 of FIG. 5 may be a liquid crystal device, cathode ray tube, plasma display device or other display device suitable for creating graphic images and alpha-numeric characters recognizable to a user. Optional cursor control device 813 allows the computer user to dynamically signal the movement of a visible symbol (cursor) on a display screen of display device 811. Implementations of cursor control device 813 include a trackball, mouse, touch pad, joystick or special keys on alphanumeric input device 812 capable of signaling movement of a given direction or manner of displacement. Alternatively, in one embodiment, the cursor can be directed and/or activated via input from alpha-numeric input device 812 using special keys and key sequence commands or other means such as, for example, voice commands.

Computer system 800 also includes an I/O device 814 for coupling computer system 800 with external entities. In one embodiment, I/O device 814 is a modem for enabling wired or wireless communications between computer system 800 and an external network such as, but not limited to, the Internet. Referring still to FIG. 8, various other components are depicted for computer system 800. Specifically, when present, an operating system 802, applications 803, modules 804, and data 805 are shown as typically residing in one or some combination of computer usable volatile memory 806, e.g. random access memory (RAM), and data storage unit 807. However, in an alternate embodiment, operating system 802 may be stored in another location such as on a network or on a flash drive. Further, operating system 802 may be accessed from a remote location via, for example, a coupling to the interne. In one embodiment, the present technology is stored as an application 803 or module 804 in memory locations within RAM 806 and memory areas within data storage unit 807.

The present technology may be described in the general context of computer-executable instructions stored on computer readable medium that may be executed by a computer. However, one embodiment of the present technology may also utilize a distributed computing environment where tasks are performed remotely by devices linked through a communications network.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the Claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A non-transitory computer-readable medium with an executable program stored thereon, wherein the program instructs a processor connected to a network to perform operations comprising:

establishing an assessor account for an assessor in an assessment database, wherein said assessor account comprises assessment attributes of an assessor;

establishing an article record for an article in said assessment database, wherein said article is composed of one or more subparts, wherein said article record includes a URI, an association of said article record to said assessor account, and an article status from said assessor for each said subpart, wherein said article status comprises a status selected from the group consisting of trusted, unknown and mistrusted;

responding to a request from an article viewer, wherein said request includes said URI and an attribute of interest, wherein said attribute of interest comprises a filter based on said article status, by querying said assessment database, determining if said URI is associated with said article record, filtering each of said subparts by said attribute of interest and returning to said article viewer a response comprising said article subparts matching said attribute of interest in said request.

2. The non-transitory computer-readable medium of claim 1 wherein establishing an assessor account includes requiring the assessor to confirm said assessor's identity.

3. The non-transitory computer-readable medium of claim 1 wherein establishing an assessor account includes a third party confirming the assessor's identity.

4. The non-transitory computer-readable medium of claim 1 wherein said response further includes said assessment attributes.

5. The non-transitory computer-readable medium of claim 1 wherein said article viewer displays an icon representing said article status.

6. The non-transitory computer-readable medium of claim 1 further comprising modifying said article status in response to a challenge from a challenging assessor wherein said challenge has successfully traversed an adjudication process.

7. The non-transitory computer-readable medium of claim 1 wherein said article record may be associated with a plurality of assessor accounts.

8. The non-transitory computer-readable medium of claim 1 wherein said article record may represent a directory of articles.

* * * * *